(12) United States Patent
Bengtsson et al.

(10) Patent No.: US 10,715,222 B2
(45) Date of Patent: Jul. 14, 2020

(54) MULTI-INPUT MULTI-OUTPUT PILOT SIGNALS

(71) Applicant: Sony Mobile Communications Inc., Tokyo (JP)

(72) Inventors: Erik Bengtsson, Eslöv (SE); Fredrik Rusek, Eslöv (SE); Ove Edfors, Södra Sandby (SE)

(73) Assignees: Sony Mobile Communications Inc., Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 16/311,523

(22) PCT Filed: Jun. 23, 2016

(86) PCT No.: PCT/EP2016/064561
§ 371 (c)(1),
(2) Date: Dec. 19, 2018

(87) PCT Pub. No.: WO2017/220150
PCT Pub. Date: Dec. 28, 2017

(65) Prior Publication Data
US 2019/0260433 A1 Aug. 22, 2019

(51) Int. Cl.
*H04B 7/0417* (2017.01)
*H04L 5/00* (2006.01)
*H04L 25/02* (2006.01)

(52) U.S. Cl.
CPC ......... *H04B 7/0421* (2013.01); *H04L 5/0048* (2013.01); *H04L 25/0224* (2013.01)

(58) Field of Classification Search
CPC .... H04B 7/0421; H04B 7/024; H04B 7/0417; H04B 7/0632; H04B 7/0643; H04L 25/0204; H04L 25/0228; H04L 25/0248
See application file for complete search history.

(56) References Cited

U.S. PATENT DOCUMENTS

| 8,588,206 | B2 | 11/2013 | Safavi et al. | |
| 2006/0256761 | A1* | 11/2006 | Meylan | H04B 7/0417 370/338 |
| 2012/0243424 | A1* | 9/2012 | Wang | H04B 7/024 370/252 |
| 2016/0156401 | A1 | 6/2016 | Oniggosanusi et al. | |
| 2018/0183506 | A1* | 6/2018 | Hessler | H04L 27/3477 |

OTHER PUBLICATIONS

International Search Report and Written Opinion of the International Searching Authority corresponding to International Patent Application No. PCT/EP2016/064561 dated Mar. 20, 2017. (11 pages).

* cited by examiner

*Primary Examiner* — David S Huang
(74) *Attorney, Agent, or Firm* — Myers Bigel, P.A.

(57) ABSTRACT

A device controls each antenna to transmit at least one first UL pilot signal and to receive, for each first UL pilot signals DL data encoded according to the respective first UL pilot signal. The receive properties of the DL data are combined and a second UL pilot signal is determined based on the combined receive properties. The second UL pilot signal is repeatedly transmitted. The techniques may be applied in a massive multi-input multi-output scenario.

21 Claims, 5 Drawing Sheets

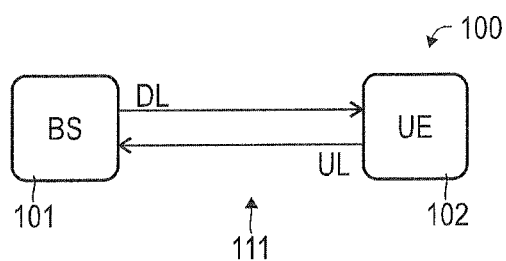
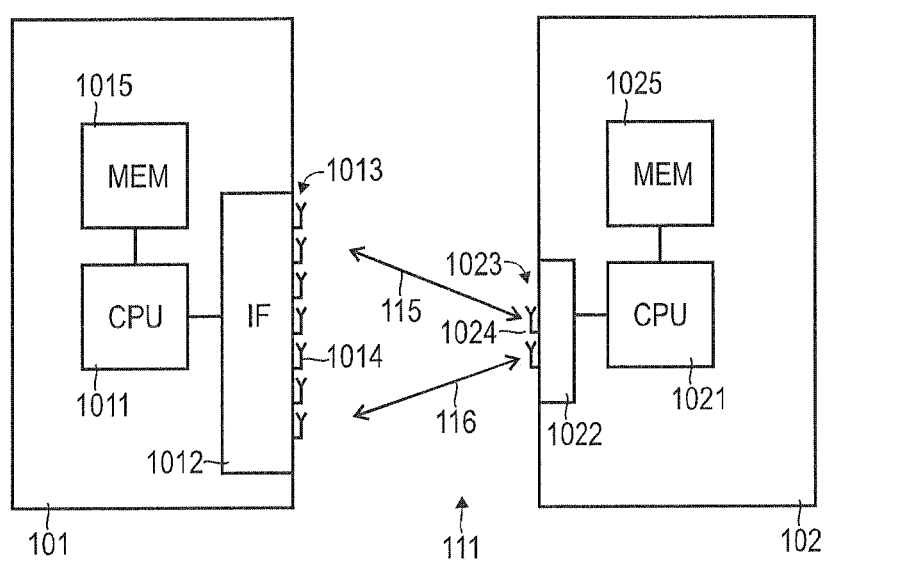

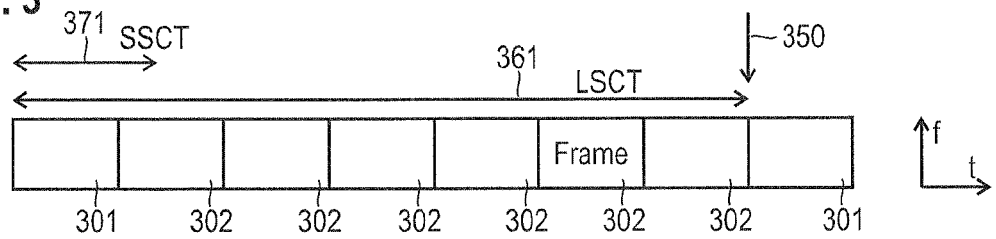
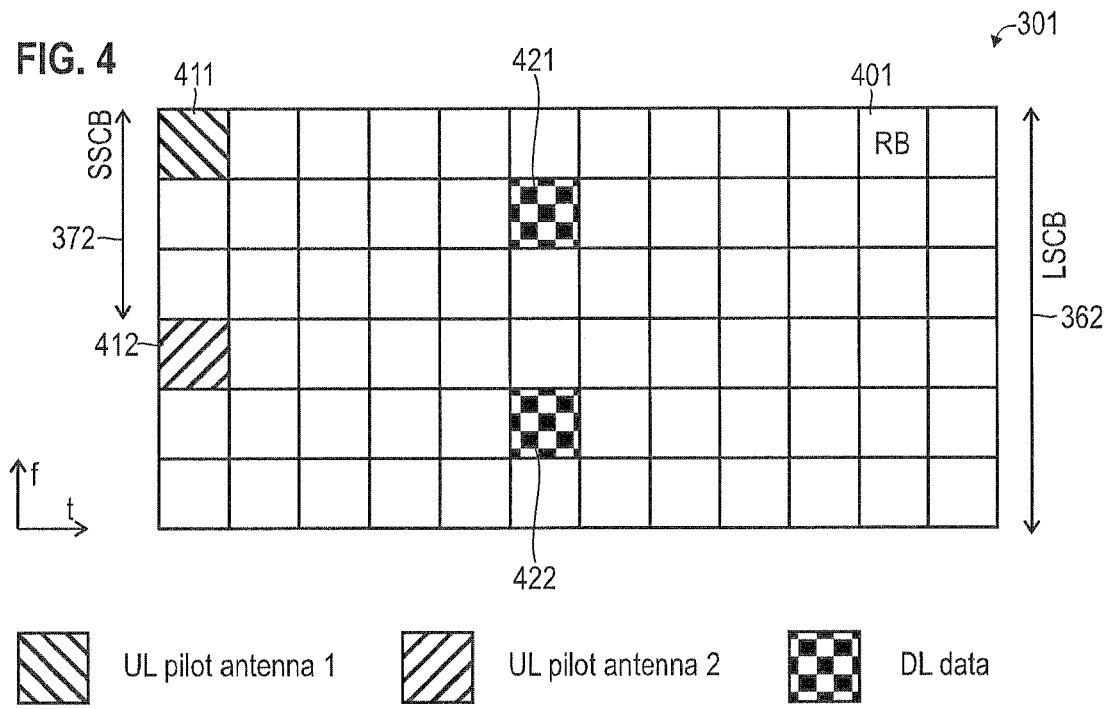
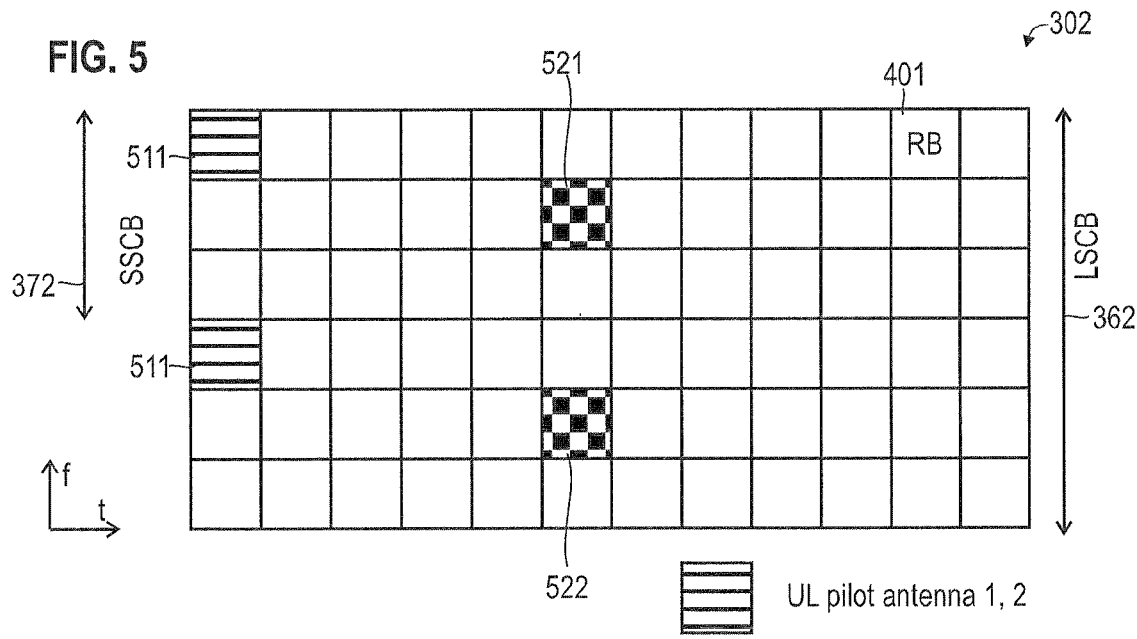

MULTI-INPUT MULTI-OUTPUT PILOT SIGNALS

CROSS REFERENCE TO RELATED APPLICATIONS

This application is a 35 U.S.C. § 371 national stage application of PCT International Application No. PCT/EP2016/064561, filed on Jun. 23, 2016, the contents of which are incorporated herein by reference in its entirety. The above-referenced PCT International Application was published in the English language as International Publication No. WO 2017/220150 A1 on Dec. 28, 2017.

TECHNICAL BACKGROUND

Various examples relate to a device comprising a transceiver comprising a plurality of antennas and further comprising at least one processor configured to control each antenna to transmit at least one first uplink pilot signal. The at least one processor is further configured to receive, via the transceiver and for each first uplink pilot signal, downlink data. The downlink data is encoded according to the respective first uplink pilot signal. The at least one processor is further configured to combine the receive properties of the downlink data received for the first uplink pilot signals and to determine a second uplink pilot signal based on the combined received properties. The device is further configured to control at least one of the antennas to repeatedly transmit the second uplink pilot signal.

BACKGROUND

Utilization of multiple antennas in a massive multi-input multi-output (massive MIMO, MaMi) pre-coded network is not a straight forward task. In MaMi, the base station (BS) comprises one or more antenna arrays having a plurality of antennas. By combining the signals from all antennas additional gain and/or spatial resolution can be obtained.

For MaMi technology, the channel is sounded using pilot signals. Typically, uplink (UL) pilot signals are transmitted from the terminal to the BS. Under the assumption of reciprocity of the channel, the UL pilot signals are used to determine encoding of DL (DL) data (link adaptation). Such an approach is facilitated by time-division duplexing (TDD) approaches where UL and DL data is alternatingly communicated.

In a particular scenario, also the terminal comprises a plurality of antennas. Here, depending on the choice of the UL pilot signals, different spatial streams will result for the DL data: this can affect the transmission reliability and/or capacity. On the other hand, depending on the UL pilot signals, it is also possible to achieve diversity: if the different spatial streams can be received by more than one antenna of the terminal, the transmission reliability and/or capacity can be increased.

Small-scale fading as well as large-scale fading typically add variation to the channel and, in order for the terminal to determine the best strategy to utilize multiple antennas, some approach for channel sounding and link adaptation is needed. See Rusek, Fredrik, et al. "Scaling up MIMO: Opportunities and challenges with very large arrays." *IEEE Signal Processing Magazine* 30.1 (2013): 40-60.

The terminal may implement different strategies for channel sounding and link adaptation. A particular accurate approach is achieved by mapping the UL pilot signals to the instantaneous channel by deriving the Gram matrix $G=HH^H$. H defines the channel. R is sometimes referred to as channel correlation matrix and it eigenvector defines the eigenbeam. Thereby, a large time-resolution of the channel sounding may be achieved and small-scale fading is considered. This, however, typically requires comprehensive information on the channel correlation matrix to be shared between the terminal and the BS—which will consume large bandwidth on the channel and add significant overhead. Also the antennas of the terminals are required to transmit orthogonal UL pilot signals which will take additional system resources.

SUMMARY

Thus, advanced techniques for MaMi transmission are required which overcome or mitigate at least some of the above-identified drawbacks and restrictions.

This need is met by the features of the independent claims. The dependent claims define embodiments.

Various examples relate to a device comprising a transceiver comprising a plurality of antennas and further comprising at least one processor configured to control each antenna to transmit at least one first UL pilot signal. The at least one processor is further configured to receive, via the transceiver and for each first UL pilot signal, DL data. The DL data is encoded according to the respective first UL pilot signal. The at least one processor is further configured to combine the receive properties of the DL data received for the first UL pilot signals and to determine a second UL pilot signal based on the combined receive properties. The device is further configured to control at least one of the antennas to repeatedly transmit the second UL pilot signal.

Various examples relate to a method. The method comprises controlling each antenna to transmit at least one first UL pilot signal. The method further comprises receiving, for each first UL pilot signal, DL data encoded according to the respective first UL pilot signal. The method further comprises combining the receive properties of the DL data received for the first UL pilot signals and determining a second UL pilot signal based on the combined receive properties. The method further comprises controlling at least one of the antennas to repeatedly transmit the second UL pilot signal.

According to various examples, a computer program product is provided. The computer program product comprises program code which may be executed by at least one processor. Executing the computer program product code causes the at least one processor to perform a method. The method comprises controlling each antenna of to transmit at least one first UL pilot signal. The method further comprises receiving, for each first UL pilot signal, DL data encoded according to the respective first UL pilot signal. The method further comprises combining the receive properties of the DL data received for the first UL pilot signals and determining a second UL pilot signal based on the combined receive properties. The method further comprises controlling at least one of the antennas to repeatedly transmit the second UL pilot signal.

According to various examples, a method comprises controlling a plurality of antennas to each transmit at least one first uplink pilot signal. The method further comprises receiving the uplink pilot signals and encoding downlink data according to the respective first uplink pilot signal and transmitting the downlink data. The method further comprises receiving, for each first uplink pilot signal, the downlink data and combining the receive properties of the downlink data received for the first uplink pilot signals and determining a second uplink pilot signal based on the combined receive properties. The method further comprises controlling at least one of the antennas to repeatedly transmit the second uplink pilot signal.

According to various examples, a computer program product is provided. The computer program product comprises program code which may be executed by at least one processor. Executing the computer program product code causes the at least one processor to perform a method. The method comprises controlling a plurality of antennas to each transmit at least one first uplink pilot signal. The method further comprises receiving the uplink pilot signals and encoding downlink data according to the respective first uplink pilot signal and transmitting the downlink data. The method further comprises receiving, for each first uplink pilot signal, the downlink data and combining the receive properties of the downlink data received for the first uplink pilot signals and determining a second uplink pilot signal based on the combined receive properties. The method further comprises controlling at least one of the antennas to repeatedly transmit the second uplink pilot signal.

According to an example, a method comprises transmitting, on a channel and via a transceiver comprising a plurality of antennas, an uplink pilot signal according to a value indicative of the channel correlation matrix.

The examples described above and the examples described hereinafter may be combined with each other and further examples.

BRIEF DESCRIPTION OF THE DRAWINGS

FIG. 1 schematically illustrates the radio channel between the BS and the terminal.

FIG. 2 schematically illustrates a MaMi scenario where the BS comprises an antenna array and the terminal comprise multiple antennas.

FIG. 3 schematically illustrates a sequence of transmission frames, each transmission frame facilitating communication of UL pilot signals and DL data according to various embodiments.

FIG. 4 schematically illustrates a first type of transmission frames comprising UL pilot signals according to various embodiments.

FIG. 5 schematically illustrates a second type of transmission frames comprising UL pilot signals determined based on receive properties of downlink data encoded according to the UL pilot signals included in the first type of transmission frames according to various embodiments.

DETAILED DESCRIPTION OF EMBODIMENTS

Figure 6:
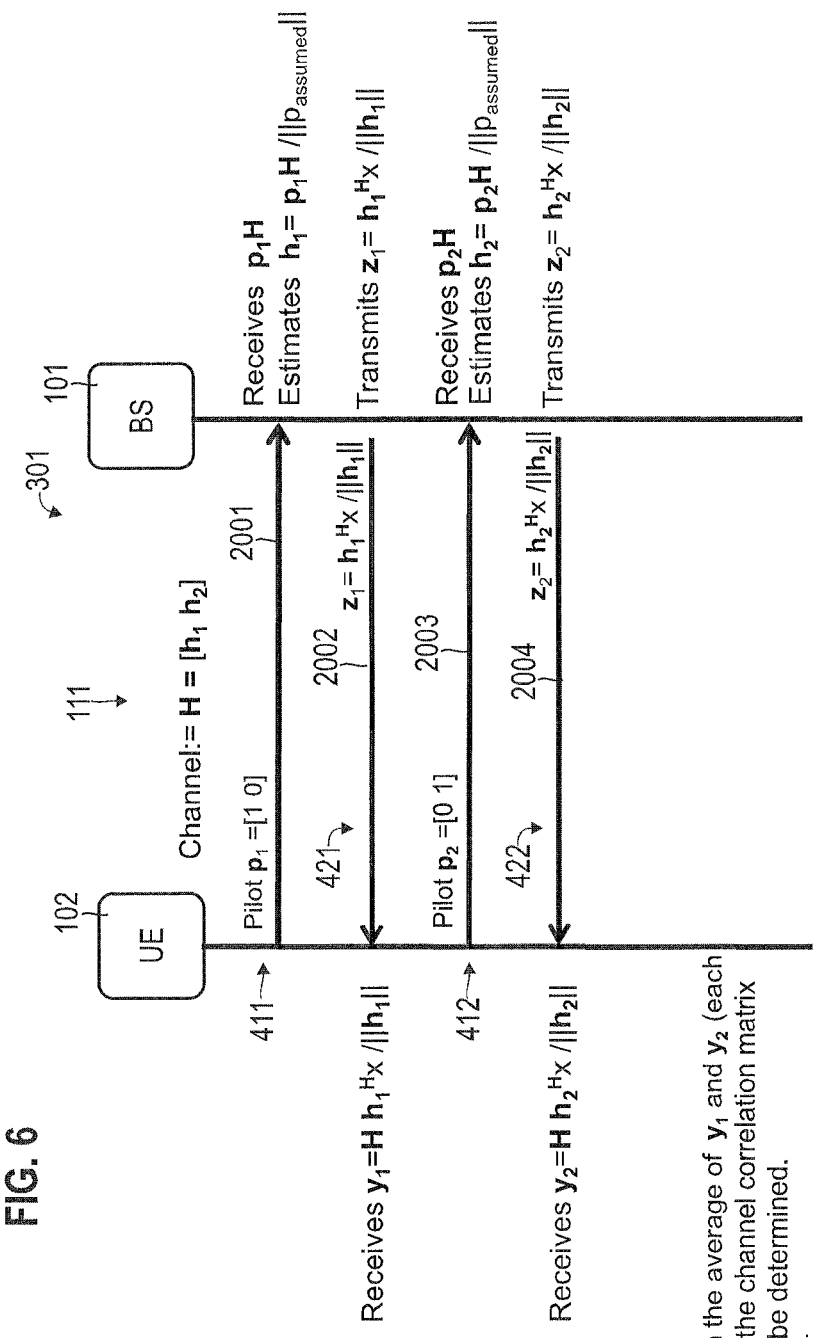
FIG. 6 is a signaling diagram illustrating communication of UL pilot signals according to various embodiments.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of communicating pilot signals are disclosed. In particular, techniques of communicating pilot signals in a MaMi scenario are disclosed. Various examples relate to communicating UL pilot signals from the terminal to the BS.

In various examples, UL pilot signals are transmitted by a terminal which have been determined based on the channel. According to an example, an UL pilot signal is transmitted according to a value indicative of the channel correlation matrix. The value may be the dominant eigenmode of the channel correlation matrix.

In some examples, the terminal may determine the value based on channel sounding; for this, the terminal may receive DL data. The terminal may then determine the value based on the DL data, e.g., based on a receive property of the DL data. In other examples, the channel sounding may be implemented by the BS. Then the BS may inform the terminal on the value indicative of the channel correlation matrix; for this, control signaling may be implemented. In still further examples, the channel may be pre-sounded in a spatially resolved manner. Corresponding data on the value may be stored in a database. Then, based on the position of the terminal, a look-up of the value may be implemented.

The terminal comprises a plurality of antennas. The BS comprises an antenna array having a plurality of antennas. Typically, the count of antennas is larger for the BS than for the terminal. E.g., the terminal may comprise at least 2 antennas, preferably at least 8 antennas, more preferably at least 16 antennas. E.g., the BS may comprise at least 100 antennas, preferably at least 150 antennas, more preferably at least 250 antennas. Sometimes, such a scenario is referred to as MaMi.

Determining an UL pilot signal according to the value indicative of the channel correlation matrix may correspond to: setting amplitude and/or phase of each one of the antennas according to the respective contribution to the value indicative of the channel correlation matrix. E.g., the value may be a vector comprising as many elements as there are antennas. Each element may be a complex number. Then, it may be possible that the different antennas are associated with different elements of the vector. The amplitude may then be set according to the real part of the respective element; the phase may then be set according to the imaginary part of the respective element. E.g., the value indicative of the channel correlation matrix may correspond to the dominant eigenmode of the channel correlation matrix, i.e., of the channel.

The techniques described herein facilitate sounding of the radio channel. Under the assumption of reciprocity, based on the UL pilot signals, it is possible to sound, both, the UL channel, as well as the DL channel. The channel sounding can be used for link adaptation of the channel. In particular, it is possible to encode data communicated on the channel according to the UL pilot signals.

The techniques described herein enable to accurately account for large-scale fading of the channel. On the other hand, the techniques described herein enable to reduce the overhead due to channel sounding by limiting the accuracy with which small-scale fading is addressed in the link adaptation.

For this, according to some examples, the receive properties of DL data received for a plurality of first UL pilot signals is combined to determine a second UL pilot signal based on the combined receive properties. The DL data is encoded according to the respective first UL pilot signal.

Here, encoding is sometimes also referred to as precoding. Then, the second UL pilot signal can be repeatedly transmitted over a certain time duration and/or frequency bandwidth. Such techniques allow for averaging of small-scale fading by combining the receive properties of a plurality of first UL pilot signals. Thereby, the fast-changing/short-lived effect of this small-scale fading on the second UL pilot signals is reduced and it is possible to benefit from the larger frequency-domain and time-domain coherence of the channel associated with the large-scale fading.

In some examples, it is thus possible to consider the average behavior of the channel: this may enable to use the dominant eigenmode of the channel correlation matrix, $R=E\{HH^H\}$. Compensation then targets on the large-scale fading. Large-scale fading may be caused by shadowing and antenna loading phenomena. Both the coherence bandwidth and coherence time is greater for the large-scale fading compared to the small-scale fading.

The techniques described herein are based on the finding that such an approach offers particular advantages for MaMi. This is because for MaMi the small-scale fading is typically inherently reduced due to the so-called hardening effect. See Hochwald, Bertrand M., Thomas L. Marzetta, and Vahid Tarokh. "Multiple-antenna channel hardening and its implications for rate feedback and scheduling." IEEE transactions on Information Theory 50.9 (2004): 1893-1909. Hence, there is a tendency that for more antennas used in the system, the difference between instantaneous and average channel sounding becomes smaller. Thus, the channel hardening effect reduces the need for averaging in a MaMi precoded system. The hardening effect ideally cancels the small-scale fading as the number of BS antennas grows. Therefore, a significant relaxation in the need for averaging will result also in a realistic MaMi system.

FIG. 1 schematically illustrates a wireless communication network 100 which may benefit from the techniques disclosed herein. E.g., the network 100 may be a Third Generation Partnership Project (3GPP) specified network such as 3G, 4G and upcoming 5G. Other examples include point-to-point networks such as Institute of Electrical and Electronics Engineers (IEEE)—specified networks, e.g., the 802.11x Wi-Fi protocol or the Bluetooth protocol.

The network 100 comprises a BS 101 and the terminal 102 (labeled user equipment, UE in the FIGs.). A radio channel 111 is established between the BS 101 and the terminal 102. The channel 111 comprises a DL channel from the BS 101 to the terminal 102; and further comprises an UL channel from the terminal 102 to the BS 101. TDD and/or frequency-division duplexing (FDD) may be employed for the DL channel and the UL channel.

FIG. 2 schematically illustrates the BS 101 and the terminal 102 in greater detail. The BS 101 comprises a processor 1011 and a transceiver 1012. The transceiver 1012 comprises a module 1013 comprising a plurality of antennas 1014. Each antenna 1014 may comprise one or more electrical traces to carry a radio frequency current. Each antenna 1014 may comprise one or more LC-oscillators implemented by the electrical traces. Each traces may radiate electromagnetic waves with a certain beam pattern. As such, the antennas 1014 may form an antenna port for providing an output signal to the radiating LC-oscillators. The BS 101 further comprises a memory 1015, e.g., a non-volatile memory. The memory may store control instructions that can be executed by the processor 1011. Executing the control instructions causes the processor 1011 to perform techniques with respect to channel sounding and link adaptation as described herein.

The terminal 102 comprises a processor 1021 and a transceiver 1022. The transceiver 1022 comprises a module 1023 comprising a plurality of antennas 1024. Each antenna 1024 may comprise one or more electrical traces to carry a radio frequency current. Each antenna 1024 may comprise one or more LC-oscillators implemented by the electrical traces. Each traces may radiate electromagnetic waves with a certain beam pattern. As such, the antennas 1024 may form an antenna port for providing an output signal to the radiating LC-oscillators. The terminal 102 further comprises a memory 1025, e.g., a non-volatile memory. The memory 1025 may store control instructions that can be executed by the processor 1021. Executing the control instructions causes the processor 1021 to perform techniques with respect to channel sounding end link adaptation as described herein.

FIG. 2 schematically illustrates that different spatial streams 115, 116 are supported between the transceivers 1012, 1022 on the channel 111. The different spatial streams 115, 116 are associated with different antennas 1023, 1024 of the terminal 102. Different ones of the spatial streams 115, 116 may have different transmission characteristics such as number of reflections, path loss, and generally transmission reliability and/or capacity. Different spatial streams 115, 116 are obtained by different combination of pilot signals from the UE antennas.

By the techniques of channel sounding and link adaptation described herein, it is possible to select preferred ones of the different spatial streams 115, 116 for communication of data on the channel 111. In particular, by the techniques described herein, it is possible to perform channel sounding and link adaptation with limited overhead and limited complexity.

This is achieved by a particular strategy for communicating UL pilot signals. In particular, UL pilot signals are communicated according to a certain strategy as a function of time and frequency. Small-scale fading is averaged out when determining UL pilot signals that can be statically used for the long-scale coherence time and bandwidth.

FIG. 3 illustrates a time sequence of transmission frames 301, 302 used for communication on the channel 111. Depending on the particular radio access technology, the transmission frames 301, 302 may be referred to as one or more of the following: frames; sub-frames; and timeslots.

Depending on the particular implementation of the transmission frames 301, 302, the duration of each transmission frame 301, 302 may greatly vary. E.g., in some scenarios an individual transmission frame 301, 302 may be of the duration of 200 or 500 milliseconds. In other examples, an individual transmission frame 301, 302 may be of the duration of 1 second, 5 seconds, etc.

FIG. 3 illustrates a typical timescale 371 of small-scale fading; this is called the small-scale coherence time (SSCT). It is apparent that in the non-limiting example of FIG. 3, the SSCT 371 is of the same order of magnitude as the duration of a transmission frame 301, 302.

FIG. 3 further illustrates a typical timescale 361 of large-scale fading, referred to as long-scale coherence time (LSCT). The LSCT 361 fading is significantly longer than the SSCT. In realistic MaMi scenarios, the ratio between the LSCT 361 and the SSCT 371 may be at least 200, or at least 500, or at least 1000. Similar ratios typically apply for the long-scale coherence bandwidth (LSCB) with respect to the short-scale coherence bandwidth (SSCB).

The techniques described herein enable the UE to determine and track the channel correlation matrix of the channel 111. For this, a first type of transmission frames 301 is defined by using first UL pilot signals. Based on the first UL pilot signals, the channel correlation matrix is determined based on extensive channel sounding. Determining the channel correlation matrix may correspond to determining the full channel correlation matrix, R, or at least significant parts of it such as the dominant eigenmode of the channel. A value indicative of the channel correlation matrix may be determined At the same time, provisions are taken to ensure that the variation due to short-scale fading does not adversely affect the accuracy with which the channel correlation matrix is determined: for this, the receive properties of DL data encoded according to a plurality of first UL pilot signals is combined to determine a second UL pilot signal based on the combined receive properties. Combination may occur across first UL pilot signals offset in frequency domain and/or in time domain. By combining the receive properties, the influence of short-scale fading on the second pilot signal can be averaged out or at least significantly reduced.

The second UL pilot signal is then repeatedly transmitted, e.g., for duration which substantially corresponds to the LSCT 361 and/or across a bandwidth which substantially corresponds to the LSCB 362. This defines a second type of transmission frames 302. Repetitions of the transmission of the second UL pilot signal may be implemented in time domain and/or frequency domain.

FIG. 4 schematically illustrates a transmission frame 301 of the first type. The transmission frame 301 defines a resource element having a certain resource mapping. The resource element has an Orthogonal Frequency Division Multiplex (OFDM)-type structure: multiple sub-bands (six in the example of FIG. 4) are treated individually. The resource element of a transmission frame 301 is formed by a plurality of resource blocks 401. Each resource block 401 corresponds to an OFDM symbol.

Here, a plurality of UL pilot signals 411, 412 are communicated in different resource blocks 401 (in FIG. 4, the UL pilot signals 411, 412 are illustrated by the dashed filling of the corresponding resource blocks). In particular, the UL pilot signals 411, 412 may be predetermined: i.e., the different antennas 1024 contributions are pre-programmed for the different UL pilot signals 411, 412. Thus, there may at least as many UL pilot signals 411, 412 transmitted as there are antennas 1024. This enables accurate sounding of the channel 111.

A particular comprehensive sounding of the channel 111 is possible where the UL pilot signals 411, 412 form a basis of the space defined by the antennas 1024 of the antennas of the terminal 102. If the UL pilot signals 411, 412 form a basis of the space defined by the antennas 1024, it is possible to derive the receive property of any possible UL pilot signal by an appropriate combination of the receive properties of the transmitted UL pilot signal 411, 412. In particular, it becomes possible to conclude on the contribution of each individual antenna 1023 and to resolve each antenna-specific spatial stream 115, 116.

Here, in a simple embodiment the UL pilot signals 411, 412 may be pairwise orthogonal with respect to each other in the space defined by the antennas 1024. I.e., the different UL pilot signals 411, 412 could be antenna-selective. E.g., the UL pilot signal 411 is only contributed to by a first antenna 1024; while the second UL pilot signal 412 is only contributed to by a second antenna 1024. E.g., the UL pilot signal 411 could be defined by the vector [1,0] in antenna space, i.e., only the first antenna 1024 transmitting; the UL pilot signal 1024 could then be defined by the vector [0,1], i.e., only the second antenna 1024 transmitting. Thus, the antennas 1024 could be controlled to transmit an UL pilot signal 411, 412 one at a time. Other scenarios are possible. E.g., the vector defining the UL pilot signal 411 could be [1,1] and for the UL pilot signal 412 [1-1]. Then the sum of the received signals becomes equivalent to the case when a UL pilot signal equal to [2 0] was transmitted. The pilot signals 411, 412 may have normalized power, e.g., [1/sqrt(2) 1/sqrt(2)] and [1/sqrt(2) −1/sqrt(2)]. Based on a complete basis of the space defined by the antennas 1024, the terminal 102 is capable to contribute the individual contribution by each antenna 1024.

Each UL pilots signal 411, 412 may be expressed as a complex number [c1 c2], containing an amplitude and a phase. This typically widens the selection of how many combinations forming a complete basis there are.

In some examples, it may be preferred to implement the UL pilot signals 411, 412 such that at least two or all antennas 1024 contribute at same transmit power—if compared to scenarios where the antennas 1024 transmit one at a time: the case when all power is transmitted from a singly, strongly degraded antenna the resources results in loss of signal. For the same case with 1:1 power distribution, the maximum degradation is 3 dB.

In the example of FIG. 4, two UL pilot signals 411, 412 are communicated in the transmission frame 301. This is done to take into account the SSCB 372 and provide the channel sounding with an appropriate resolution in frequency domain. E.g., in a scenario where the SSCT 371 is shorter than the duration of an individual transmission frame 301, it would also be possible to provide additional repetitions of the UL pilot signals 411, 412 in time domain (not illustrated in FIGS. 3 and 4).

In response to transmitting the UL pilot signal 411, the terminal 102 receives the DL data 421. The DL data 421 may correspond to application-layer user data and/or control data. The DL data 421 is encoded. In particular, the DL data 421 is encoded according to the respective UL pilot signals 411. Likewise, in response to transmitting the UL pilot signal 412, the terminal 102 receives the DL data 422 which is again encoded according to the respective UL pilot signal 412.

Based on the receive properties of the DL data 421, 422, it then becomes possible to conclude which spatial streams 115, 116 offer reliable transmission. In other words, based on the combination of the receive properties of the DL data 421, 422, it becomes possible to determine the channel correlation matrix. In accordance with the channel correlation matrix, it is then possible to perform optimized communication of subsequent data in the transmission frames 302 of the second type.

FIG. 5 schematically illustrates a transmission frame 302 of the second type. Here, an UL pilot signal 511 is communicated which has been determined based on the combined receive properties of the DL data 421, 422 received during the transmission frame 301 of the first type. Hence, the UL pilot signal 511 is derived from the channel 111. The UL pilot signal 511 is not predetermined. DL data 521, 522 communicated during the transmission frame 302 is encoded according to the UL pilot signal 511.

In FIG. 5, one and the same pilot signal 511 is used within different small-scale coherence blocks. Thus, in the example of FIG. 5, the count of UL pilot signals 511 per transmission frame 302 is smaller than the number of antennas 1024. In particular, the contribution of each antenna 2014 to different transmission occurrences of the UL pilot signal 511 does not change. In particular, the UL pilot signal 511 does not form a complete basis of the space defined by the antennas 1024 of the array 1023, but rather uses an optimized configuration. From FIG. 5 it is apparent that during the transmission frame 302 of the second type the UL pilot signals 411, 412 are not transmitted. Channel sounding and link adaptation is implemented based on the UL pilot signal 511, only.

In the example of FIG. 5, both antennas of the terminal 102 contribute to the UL pilot signals 511: In some scenarios it is possible that all antennas of the terminal 102 contribute to the UL pilot signals 511. In other examples, it is possible that only one of the antennas of the terminal 102 contributes to the UL pilot signals 511. In still further examples, it is possible that some of the antennas of the terminal contribute to the UL pilot signals 511.

From FIGS. 3 and 5 it is apparent that communication of the UL pilot signal 511 is repeated for a duration corresponding to the LSCT 361. Thus, the processor 1021 may be configured to control at least one of the antennas 1024 to repeatedly transmit the UL pilot signal 511 for at least 200 transmission frames 302, preferably at least 500 transmission frames 302, more preferably at least 1.000 transmission frames 302. The processor 1021 may be configured to control at least one of the antennas 1022 to repeatedly transmit the UL pilot signal 511 for a duration of at least 200 ms, preferably at least 500 ms, more preferably at least 1.000 ms. This corresponds to the LSCT 361. By reusing the UL pilot signal 511 for a duration corresponding to the LSCT 361, system complexity can be reduced.

Likewise, the processor 1021 may be configured to control at least one of the antennas 1024 to repeatedly transmit the UL pilot signal 511 over a frequency bandwidth of at least 2 MHz, preferably at least 5 MHz, more preferably at least 10 MHz. This corresponds to the LSCB 362. By reusing the UL pilot signal 511 for a duration corresponding to the LSCB 362, system complexity can be reduced. Furthermore, overhead can be effectively reduced.

Generally, the count of UL pilot signals 411, 412 may be significantly smaller than the count of repeated transmission of the UL pilot signal 511. E.g., the count of combined receive properties may be smaller by at least a factor of 100 than the count of the repeatedly transmitted second UL pilot signal, preferably by at least a factor of 1.000, more preferably by at least a factor of 10.000. By using a significantly large count of UL pilot signals 411, 412, it is possible to accurately average out the small-scale fading. On the other hand, it is not required to increase the count of UL pilot signals 411, 412 beyond appropriate sampling of the SSCT 371 and the SSCB 372. Thereby, it is possible to limit overhead.

FIG. 6 is a signaling diagram. FIG. 6 illustrates transmission of the UL pilot signals 411, 412 during a transmission frame 301 of the first type.

The pilot signals 411, 412 form a basis of the space of antennas 1024. In one example, the UL pilot signals 411, 412 correspond to a unitary configuration, fully sounding the channel. Unitary means that [p1 p2] form a unitary matrix in the space of antennas 1024 where p1, p2 denote the UL pilot signals 411, 412, respectively. For example: $[[1\ 0]^T\ [0\ 1]^T]$. In order to determine the dominant eigenmode of the channel correlation matrix R the handset may estimate the expectation of the received DL data. In FIG. 6, H denotes the channel 111 and is a priori unknown. The channel 111 comprises the spatial streams 115, 116 denoted by $h_1$ and $h_2$. $z_1$ denotes the DL data 421 for the UL pilot signal 411, p1. $z_2$ denotes the DL data 422 for the UL pilot signal 412, p2.

The BS 101 has knowledge on the transmitted UL pilot signal 411. Based on the UL pilot signal 411 $p_{assumed}$, as well as based on a receive property of the UL pilot signal 411 $p_1 H$ transmitted at 2001, the BS 101 then estimates the spatial stream $h_1$. $\|p_{assumed}\|$ denotes the amplitude of the pilot signal 411. The BS 101 assumes channel reciprocity and thus inverts the spatial stream to yield $h_1^H$. The DL data 421 transmitted at 2002 is encoded accordingly. The receive property $y_1$ of the DL data 421 is again multiplied by the channel H. 2003 and 2004 generally correspond to 2001 and 2002 for the pilot signal 412, $p_2$, and the DL data 422, $z_2$, respectively.

It is then possible to combine the receive properties $y_1$ and $y_2$ of the DL data 421, 422 to yield the eigenmode from the correlation matrix, R. In other examples—e.g., where non-orthogonal UL pilot signals 411, 412 are used—different combinations may be used. Determining the eigenmode R corresponds to approximating the full channel correlation matrix H.

It is then possible to determine the UL pilot signal 511 subsequently to be transmitted by the terminal 102 during the transmission frames 302 of the second type in accordance with the determined eigenmode R.

Figure 7:
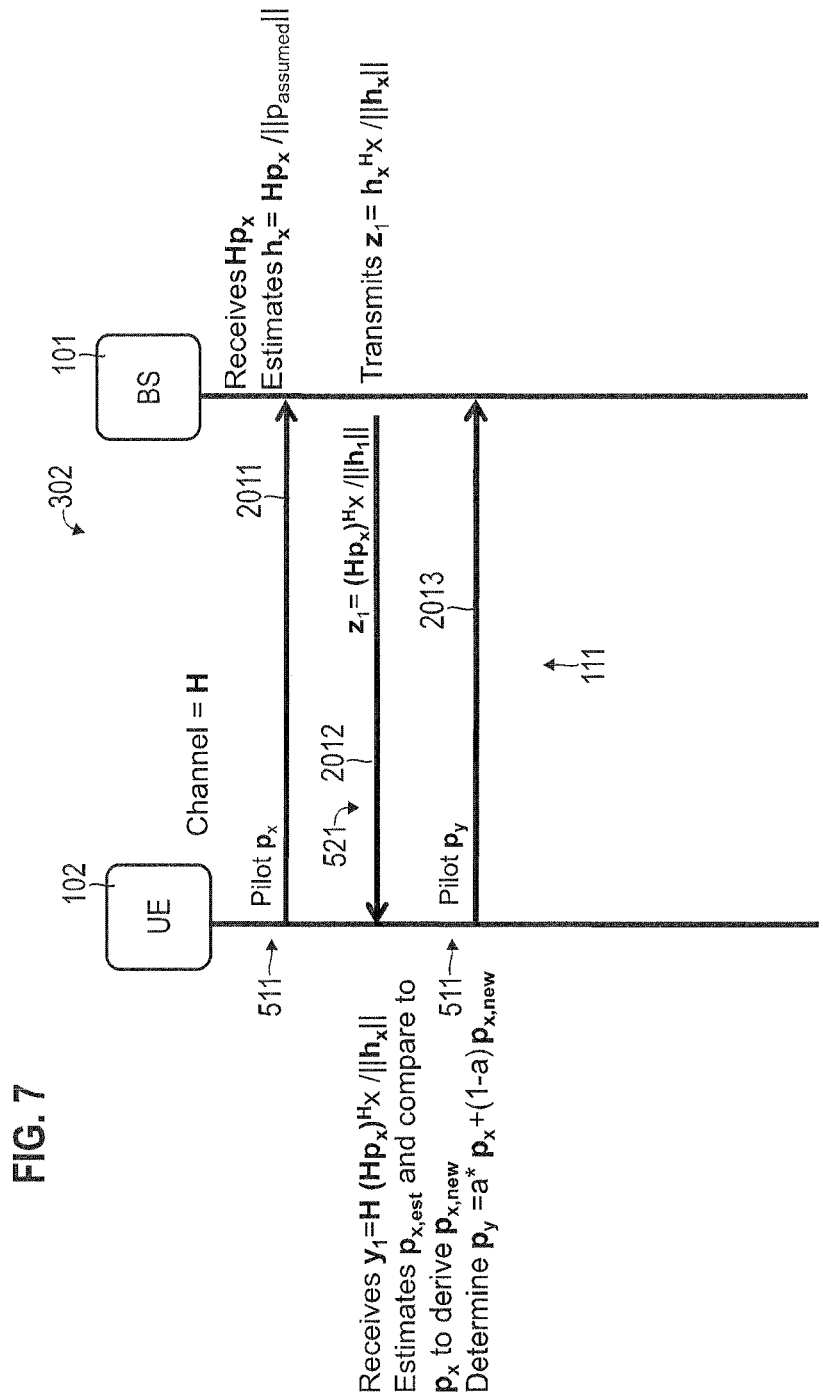
FIG. 7 is a signaling diagram illustrating communication of UL pilot signals according to various embodiments.

FIG. 7 is a signaling diagram. FIG. 7 illustrates transmission of the UL pilot signal 511 during the transmission frame 302 of the second type. The UL pilot signal 511 is denoted $p_x$.

In a simple scenario, the UL pilot signal 511—as determined from the combined receive properties of the DL data 421, 422—is repeatedly transmitted for a certain duration, e.g., corresponding to LSCT 361, and is not adjusted during said certain duration. Such a scenario has a low implementation complexity.

Differently, the scenario of FIG. 7 illustrates an example comprising adjusting of the UL pilot signal 511. Here, the change of the received UL pilot signal 511 is determined over the course of repetitive transmissions of the UL pilot signal 511. Based on said change, the UL pilot signals 511 is adjusted.

In detail, at 2011, the UL pilot signal 511, px is transmitted by the terminal 102 and received by the BS 101. The BS then, at 2012, transmits DL data 521 which is encoded according to the UL pilot signal 511 in the same manner as explained above with respect to FIG. 6. The terminal 102 determines, from the received DL data 521, small changes in the channel. The terminal 102 estimates what UL pilot signal has been assumed by the BS 101 to have been transmitted by the terminal 102, $p_{x,est}$. This estimated pilot $p_{x,est}$ is compared to the pilot that was actually transmitted $p_x$; this comparison is indicative of the change of the channel due to fading of the channel 111.

Based on the change, a new pilot, $p_{x,new}$ may be derived that better corresponds to the current channel 111. Because the new UL pilot signal 511 $p_{x,new}$ is derived from the previous UL pilot signal 511 $p_x$ derived, the UL pilot signal 511 is not determined anew without a priori assumption, but rather adjusted.

In the example above the change is determined based on a comparison of a single UL pilot signal 511. Generally, more than a single UL pilot signal 511 may be considered when determining the change. E.g., a sliding window technique may be taken into account. E.g., a variation in the receive properties of the DL data 521 over one or more transmissions can be taken into account. The variation may indicate an amplitude of the change, e.g., the variance, etc.

In the example of FIG. 7, the adjusted pilot 511 is a weighted sum of the prior UL pilot signal 511 $p_x$ and $p_{x,new}$. Hence, $p_y = a*p_x + (1-a)*p_{x,new}$ where a is a predefined weighting parameter The parameter a can be optimized for different conditions and set the adaptation speed. Generally, a sliding window technique may be used to adjust the UL pilot signal 511: the sliding window technique may take into account a certain number of previously communicated UL pilot signals 511 and/or an evolution of the certain number of previously communicated UL pilot signals 511. The position of the sliding window—which defines which previously communicated UL pilot signals 511 are taken into account—may progress/slide forward with advancing time.

At 2013, the adjusted UL pilot signal 511, $p_y$, is communicated.

Figure 8:
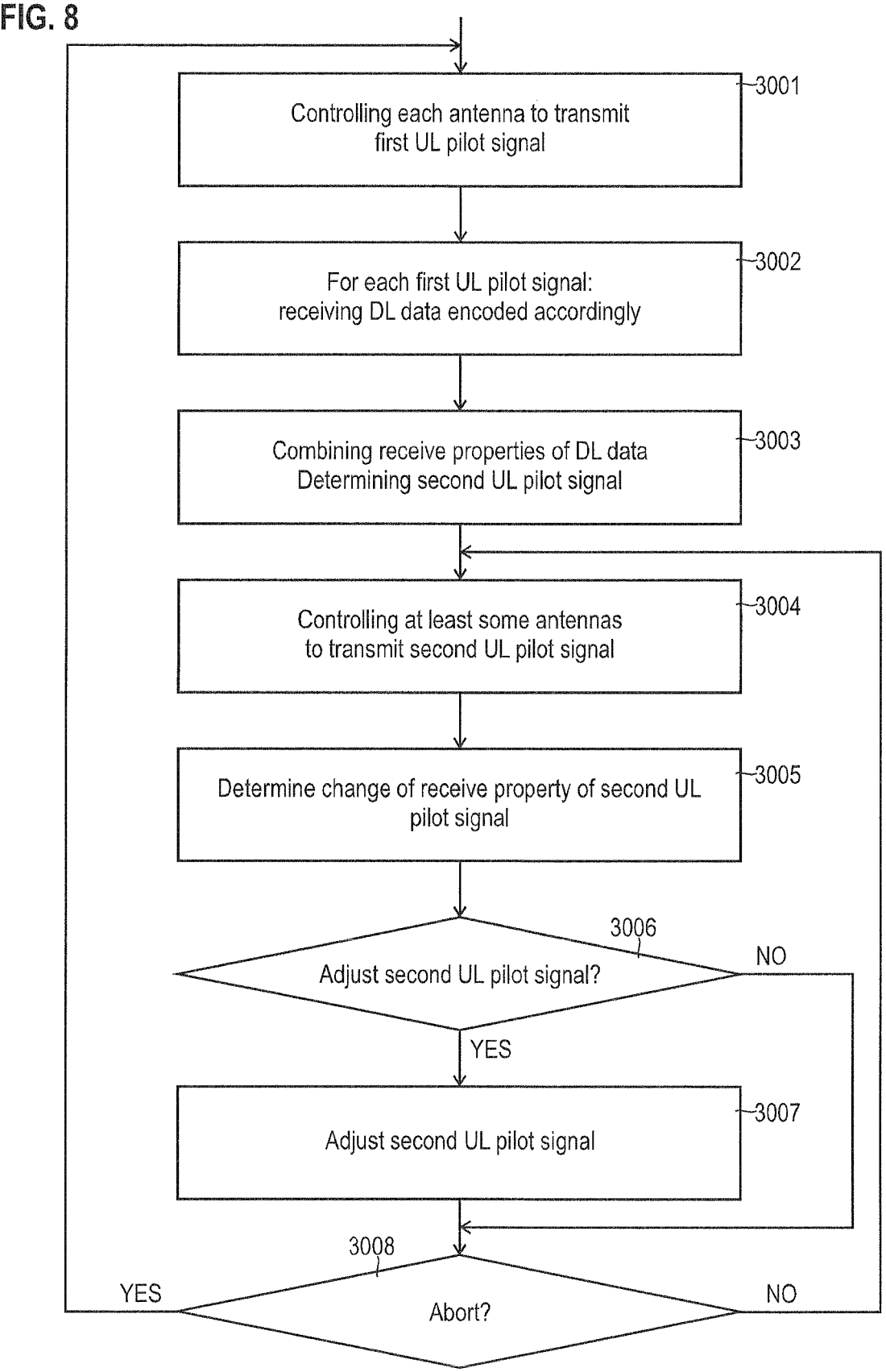
FIG. 8 is a flowchart of a method according to various embodiments.

FIG. 8 is a flowchart of a method according to various embodiments. E.g., the method of FIG. 8 may be executed by the processor 1021 of the terminal 101 based on control instructions received from the memory 1025.

First, at 3001, each antenna 1024 is controlled to transmit at least one first UL pilot signal 411, 412. Different antennas 1024 may contribute to a given first UL pilot signal 411, 412. It is also possible that each first UL pilot signal 411, 412 is exclusively associated with a given antenna 1024. In one example, the various UL pilot signals 411, 412 are orthogonal with respect to each other in the space defined by the antennas 1024. In other examples, the various UL pilot signals 411, 412 form a basis of the space defined by the antennas 1024.

At 3001, thus, the count of transmitted UL pilot signals 411, 412 corresponds, at least, to the count of antennas 1024. The UL pilot signals 411, 412 transmitted at 3001 may be communicated offset from each other in time domain and/or frequency domain. The UL pilot signals 411, 412 may sample the resources of the channel 111 at a sufficiently high resolution given the SSCT 361 and/or the SSCB 362.

At 3002, for each one of the UL pilot signals 411, 412 transmitted at 3001, DL data 421, 422 is received. The DL data 421, 422 is encoded according to the respective UL pilot signal 411, 412. Thus, based on the receive properties of the DL data 421, 422 received at 3002, it is possible to determine a value indicative of the channel correlation matrix, e.g., the dominant eigenmode. This is done at 3003 by combining the receive properties of the received DL data 421, 422. The combination at 3003 filters out variations due to the short-scale fading.

Then, the UL pilot signal 511 is determined based on the value indicative of the channel correlation matrix. The UL pilot signal 511 may correspond to the dominant eigenmode and thus favor a given spatial stream. Thus, the UL pilot signal may be non-antenna-selective. Because the UL pilot signal 511 is non-predetermined, there are no dedicated UL pilot signals associated with each one of the antennas 1024. Nonetheless, it is possible that different antennas 1024 contribute differently to the transmitting of the UL pilot signal 511. At 3004, at least one of the antennas 1024 or control to transmit the UL pilot signal 511.

In a simple scenario, 3004 is reiterated for a certain duration. E.g., the certain duration may be predefined and may correspond to the LSCT 361. In such a scenario, it is also possible that the UL pilot signal 511 is repeatedly transmitted spread over a certain predefined bandwidth. That bandwidth may also correspond to the LSCB 362.

Illustrated in FIG. 8 is an example where over the course of transmission repetitions of the UL pilot signal 511, the UL pilot signal 511 is adjusted. Said adjusting may be iteratively and/or gradually implemented. Because such adjusting is optional, blocks 3005-3007 are optional.

In block 3005, the change of the channel is determined based on a change in the received UL pilot signal 511. This may be done according to techniques as discussed above with respect to FIG. 7. Based on the change, at 3006 it is checked whether an adjustment of the UL pilot signal 511 is warrented. E.g., the UL pilot signal 511 may be selectively adjusted with a change exceeds a certain predefined threshold. If at 3006 it is decided that the UL pilot signal 511 should be adjusted, adjusting of the UL pilot signal occurs at 3007.

At 3008, it is checked whether transmission of the UL pilot signal 511 should be aborted. In a simple scenario, at 3006 the time elapsed between execution of 3003 and 3008 may be compared against a certain predefined duration. The certain predefined duration may correspond with the LSCT 306. If the UL pilot signal 511 is not valid anymore—due to the elapsed LSCT 361—, 3001 may be executed anew. I.e., it is possible that again a transmission frame 301 of the first type is communicated. Here, the UL pilot signals 411, 412 allow to extensively sound the channel and determine, a priori, the UL pilot signal 511 anew. If the abort criterion at 3007 is not fulfilled, the—possibly adjusted—UL pilot signal 511 is communicated anew at 3004.

At 3008, further abort criteria can be taken into account. E.g., 3008, it can be checked whether a certain predefined timing schedule requires 3001 to be executed anew; e.g., the timing schedule may define repetitive occurrences of the transmission frames 301 of the first time. A periodicity or average frequency of occurrence may be defined. Alternatively or additionally, at 3008 the channel quality, e.g., the DL channel quality, can be taken into account. The channel quality may be defined in terms of bit error rate, number negative acknowledgements, latency, etc. E.g., if the channel quality has significantly changed between the execution of 3003 and the current iteration of 3008, it can be judged that the channel should be extensively sounded anew by re-executing 3001. Alternatively or additionally, 3008, it is also possible to consider the reception quality of the DL data 521, 522 encoded according to the UL pilot signal 511 (cf. FIG. 7) as abort criterion at 3008. E.g., the reception quality has degraded significantly, it can be judged that 3001 should be executed anew. Alternatively or additionally, at 3008, control signaling received from the BS 101 via the channel 111 may be taken into account as abort criterion. E.g., there may be decision logic implemented at the BS 101 which remote-controls usage of the UL pilot signals 411, 412 and usage of the pilot signal 511. E.g., if the BS 101 detects degraded transmission quality on the channel 111, a corresponding control message may be transmitted by the BS 101 and received by the terminal 102, said control message prompting the terminal 102 to execute 3001 anew. Alternatively or additionally, it would also be possible to take into account the determined change the received UL pilot signal 511 between different transmissions of the UL pilot signal 511 in a manner as discussed above with respect to FIG. 7 as abort criterion at 3008. E.g., if said change exceeds a certain threshold, it would be possible to re-execute 3001 anew.

As will be appreciated from the above but of different triggers to abort transmission of the UL pilot signal 511 and to start transmission of the UL pilot signals 411, 412 are conceivable. Generally, the transmission of the UL pilot signal 511 may be aborted whenever the condition of the channel changes instantaneously, such as at the start of communication, communication of small packets, or when the terminal conditions change rapidly. The latter may be the case with the terminal moves into a room or a building or simply of the user changes the grip on the handset. Alternatively or additionally, transmission of the UL pilot signals 411, 412 may be triggered repetitively, occasionally, or based on the trigger. A timing schedule may be implemented.

Summarizing, above techniques of communicating UL pilot signals have been illustrated. The techniques comprise at least two different operational modes which enable a terminal to determine a value indicative of the channel correlation matrix without significant involvement of the BS. Such techniques correspond to open-loop determination of the value indicative of the channel correlation matrix. In a first operational mode, the value indicative of the channel correlation matrix is determined without a priori knowledge. For this, a plurality of UL pilot signals is communicated on the channel, the UL pilot signals enabling to derive significant information to yield the value indicative of the channel correlation matrix. In a second operational mode, a semi-static UL pilot signal is used for channel sounding. For moderate channel changes, it is possible that the terminal tracks changes in the received UL pilot signal and correspondingly adjusts the UL pilot signals starting from the respective baseline determined without a priori knowledge.

The techniques described herein rely on the assumption of channel reciprocity to some extent. This is because DL data can be encoded according to the UL pilot signals.

The techniques described herein may be specifically suitable for MaMi scenarios, because short-scale fading may be comparably weak due to the channel hardening effect. Thus, less frequent channel sounding may be required and the LSCT may be comparably long.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

In various examples above, the second UL pilot signal is determined based on the combined receive properties of DL data. In other examples, it is possible that the second pilot signal is determined otherwise. E.g., channel sounding may be implemented based on DL pilot signals. E.g., channel sounding may be implemented by the BS; then, the BS may inform the terminal accordingly. Also, a look-up in a predetermined spatially resolve database may be possible to obtain a value indicative of the channel correlation matrix according to which the second UL pilot signal may be transmitted.

The invention claimed is:

1. A device, comprising:
a transceiver comprising a plurality of antennas,
at least one processor configured to perform operations comprising:
controlling each antenna of the plurality of antennas to transmit at least one first uplink pilot signal;
receiving, via the transceiver and for each first uplink pilot signal, downlink data encoded according to a respective first uplink pilot signal;
combining receive properties of the downlink data received for the first uplink pilot signals and determine a second uplink pilot signal based on the combined receive properties; and
controlling at least one of the antennas to repeatedly transmit the second uplink pilot signal.

2. The device of claim 1,
wherein the first uplink pilot signals are predetermined.

3. The device of claim 1,
wherein during repeated transmission of the second uplink pilot signal the first uplink pilot signals are not transmitted.

4. The device of claim 1,
wherein the at least one processor is configured to control the at least one of the antennas to repeatedly transmit the second uplink pilot signal for a duration of at least 1.000 ms.

5. The device of claim 1,
wherein the at least one processor is configured to control the at least one of the antennas to repeatedly transmit the second uplink pilot signal over a frequency bandwidth of at least 2 MHz.

6. The device of claim 1,
wherein a count of combined receive properties is smaller by at least a factor of 1.000 than a count of the repeatedly transmitted second uplink pilot signal.

7. The device of claim 1,
wherein the at least one processor is configured to combine the receive properties of the downlink data received for different first uplink pilot signals to obtain a value indicative of a dominant eigenmode of a channel and to determine the second uplink pilot signal according to the value indicative of the dominant eigenmode of the channel.

8. The device of claim 1,
wherein the at least one processor is configured to abort transmission of the second uplink pilot signal and resume transmission of the first uplink pilot signals based on a predefined timing schedule.

9. The device of claim 1,
wherein the at least one processor is configured to abort transmission of the second uplink pilot signal and resume transmission of the first uplink pilot signals based on a downlink channel quality.

10. The device of claim 1,
wherein the at least one processor is configured to abort transmission of the second uplink pilot signal and resume transmission of the first uplink pilot signals based on a reception quality of downlink data encoded according to the second uplink pilot signal.

11. The device of claim 1,
wherein the at least one processor is configured to abort transmission of the second uplink pilot signal and resume transmission of the first uplink pilot signals in response to receiving a control message via the transceiver.

12. The device of claim 1,
wherein the at least one processor is further configured to perform operations comprising:
determining a change of the received second uplink pilot signal between different transmissions of the second uplink pilot signal; and,
adjusting the second uplink pilot signal based on the change.

13. The device of claim 12,
wherein the at least one processor is configured to determine the change of a receive property of the received properties of the second uplink pilot signal based on a variation of a plurality of different transmissions of the second uplink pilot signal.

14. The device of claim 12,
wherein the at least one processor is configured to determine the change of a receive property of the received properties based on a sliding window technique.

15. The device of claim 12,
wherein the at least one processor is configured to adjust the second uplink pilot signal based on a sliding window technique.

16. The device of claim 12,
wherein the at least one processor is configured to abort transmission of the second uplink pilot signal and resume transmission of the first uplink pilot signals when the change of a receive property of the received properties exceeds a threshold.

17. The device of claim 1,
wherein the first uplink pilot signals transmitted by the antennas form a basis of a space defined by the antennas.

18. The device of claim 1,
wherein the device is a terminal attached to a cellular network.

19. A method, comprising:
controlling a plurality of antennas to each transmit at least one first uplink pilot signal,
receiving, for each first uplink pilot signal, downlink data encoded according to a respective first uplink pilot signal,
combining receive properties of the downlink data received for the first uplink pilot signals and determining a second uplink pilot signal based on the combined receive properties, and
controlling at least one of the antennas to repeatedly transmit the second uplink pilot signal.

20. The method of claim 19, wherein the method is executed by a device comprising:
a transceiver comprising a plurality of antennas, and
at least one processor configured to perform operations of the method.

21. A method, comprising:
controlling a plurality of antennas to each transmit at least one first uplink pilot signal,
receiving the uplink pilot signals,
for each received first uplink pilot signal performing operations comprising:
encoding downlink data according to a respective first uplink pilot signal,
transmitting the downlink data,
for each first uplink pilot signal performing operations comprising:
receiving, the downlink data,
combining receive properties of the downlink data received for the first uplink pilot signals and determining a second uplink pilot signal based on the combined receive properties, and
controlling at least one of the antennas to repeatedly transmit the second uplink pilot signal.

* * * * *